United States Patent
Tastad (10) Patent No.: US 7,540,806 B2
(45) Date of Patent: Jun. 2, 2009

(54) RELEASABLE DISPLAY MOUNTING SYSTEM AND METHOD

(75) Inventor: Gregory J. Tastad, Kenosha, WI (US)

(73) Assignee: WMS Gaming Inc., Waukegan, IL (US)

( * ) Notice: Subject to any disclaimer, the term of this patent is extended or adjusted under 35 U.S.C. 154(b) by 353 days.

(21) Appl. No.: 11/032,386

(22) Filed: Jan. 10, 2005

(65) Prior Publication Data

US 2006/0154732 A1    Jul. 13, 2006

(51) Int. Cl.
A63F 13/08    (2006.01)
(52) U.S. Cl. ............................ 463/46; 463/25; 463/47; 273/145 E; 273/148 B; 273/269; 273/280; 16/324; 16/334; 312/223.1; 312/223.3; 312/405; 361/679.21; 361/679.27; 361/679.29
(58) Field of Classification Search ............... 463/25, 463/46, 47; 273/118 R, 121 B, 143 R, 269, 273/292, 145 E, 148 B, 280; 248/291.1, 248/292.12, 917, 919, 140, 142, 221.11, 248/222.11, 222.13, 222.14, 407, 408, 681, 248/918, 920, 27.3, 223.41, 288.51, 292.13, 248/921–923; 349/58; 40/460; 211/192; 16/324, 326, 334, 357, 361, 141, 144; 312/223.1, 312/223.3, 319.1, 319.2, 405; 361/681–683, 361/679.21, 679.26, 679.27, 679.28, 679.29; 29/240, 441, 445, 759
See application file for complete search history.

(56) References Cited

U.S. PATENT DOCUMENTS

| | | | | |
|---|---|---|---|---|
| 3,731,342 A | * | 5/1973 | Cousin | 16/329 |
| 3,924,775 A | * | 12/1975 | Andreaggi et al. | 220/756 |
| 4,202,015 A | * | 5/1980 | Udo et al. | 348/782 |
| 4,666,328 A | * | 5/1987 | Ryu | 403/92 |
| 4,718,127 A | * | 1/1988 | Rittmann et al. | 2/424 |
| 4,718,672 A |   | 1/1988 | Okada | 273/143 |
| 4,832,299 A | * | 5/1989 | Gorton et al. | 248/231.71 |
| 5,428,350 A | * | 6/1995 | Kurcbart et al. | 340/7.63 |
| 5,687,939 A | * | 11/1997 | Moscovitch | 248/122.1 |
| 5,713,633 A | * | 2/1998 | Lu | 297/364 |
| 5,805,415 A | * | 9/1998 | Tran et al. | 361/681 |
| 5,813,914 A | * | 9/1998 | McKay et al. | 463/46 |
| 6,019,332 A | * | 2/2000 | Sweere et al. | 248/284.1 |

(Continued)

FOREIGN PATENT DOCUMENTS

WO    WO 03/028829    4/2003

*Primary Examiner*—Peter DungBa Vo
*Assistant Examiner*—Arthur O. Hall
(74) *Attorney, Agent, or Firm*—Nixon Peabody LLP (57) ABSTRACT

A releasable mounting system that includes a mounting assembly and a release assembly attached to a display assembly. The mounting assembly includes a hub assembly having spokes that connect a wheel to the hub, which is mounted to a trunnion. At the intersections of the spokes and wheel are protrusions adapted to mate with corresponding detents arranged radially about the trunnion and formed in a plate against which the hub assembly is positioned. The release assembly includes a release attached to a release plate, the release being movable relative to the plate. A channel formed in the release receives the hub assembly and a hook portion on the release holds the hub assembly in the release until movement of the release causes it to release the hub assembly. The display is pivotable about the trunnion in fixed stops defined by the detents and is also releasable by operating the release.

36 Claims, 11 Drawing Sheets

U.S. PATENT DOCUMENTS

| | | | |
|---|---|---|---|
| 6,068,101 A | 5/2000 | Dickenson et al. | 194/206 |
| 6,112,370 A * | 9/2000 | Blanchard et al. | 16/325 |
| 6,128,184 A * | 10/2000 | Ito et al. | 361/681 |
| 6,135,884 A | 10/2000 | Hedrick et al. | 463/20 |
| 6,164,645 A | 12/2000 | Weiss | 273/138.2 |
| 6,254,481 B1 | 7/2001 | Jaffe | 463/20 |
| 6,266,236 B1 * | 7/2001 | Ku et al. | 361/681 |
| 6,357,712 B1 * | 3/2002 | Lu | 248/291.1 |
| 6,475,087 B1 | 11/2002 | Cole | 463/20 |
| 6,512,670 B1 * | 1/2003 | Boehme et al. | 361/681 |
| 6,532,627 B2 * | 3/2003 | Audisio | 16/334 |
| 6,590,547 B2 * | 7/2003 | Moriconi et al. | 345/30 |
| 6,623,006 B2 * | 9/2003 | Weiss | 273/138.2 |
| 6,644,611 B1 * | 11/2003 | Tai | 248/292.13 |
| 6,665,175 B1 * | 12/2003 | deBoer et al. | 361/681 |
| 6,682,161 B2 * | 1/2004 | Yun | 312/405 |
| 6,711,780 B2 * | 3/2004 | Lee | 16/326 |
| 6,758,454 B2 * | 7/2004 | Smed | 248/314 |
| 6,997,810 B2 * | 2/2006 | Cole | 463/46 |
| 7,059,693 B2 * | 6/2006 | Park | 312/405.1 |
| 7,147,191 B2 * | 12/2006 | Ichikawa et al. | 248/292.12 |
| 7,267,613 B2 * | 9/2007 | Cole | 463/20 |
| 7,283,355 B2 * | 10/2007 | Han | 361/683 |
| 2002/0139822 A1 * | 10/2002 | Infanti | 224/197 |
| 2003/0027627 A1 | 2/2003 | Cole | 463/20 |
| 2004/0018870 A1 | 1/2004 | Cole | 463/20 |
| 2005/0056750 A1 * | 3/2005 | Lai et al. | 248/282.1 |
| 2005/0059496 A1 * | 3/2005 | Hanchar | 463/46 |
| 2005/0121578 A1 * | 6/2005 | Asamarai et al. | 248/284.1 |
| 2006/0175499 A1 * | 8/2006 | Price et al. | 248/278.1 |

* cited by examiner

RELEASABLE DISPLAY MOUNTING SYSTEM AND METHOD

CROSS-REFERENCE TO RELATED APPLICATION

This application is related to commonly assigned U.S. application Ser. No. 10/660,271, entitled "Gaming Machine With a Trunnion Mounted Display," filed Sep. 11, 2003.

FIELD OF THE INVENTION

The present invention relates generally to display mounting systems and, more particularly, to a releasable display mounting system for a gaming terminal.

BACKGROUND OF THE INVENTION

Gaming machines, such as slot machines, video poker machines, and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning each machine is roughly the same (or believed to be the same), players are most likely to be attracted to the most entertaining and exciting of the machines.

Consequently, shrewd operators strive to employ the most entertaining and exciting machines available because such machines attract frequent play and, hence, increase profitability to the operator. In the competitive gaming machine industry, there is a continuing need for gaming machine manufacturers to produce new types of games, or enhancements to existing games, which will attract frequent play by enhancing the entertainment value and excitement associated with the game.

Some gaming machines employ video displays either as a main display or in the top box area as a secondary display. Ready access from the front of the gaming machine to the areas behind or beside these displays is desirable to facilitate rapid servicing or replacement without prolonged downtime. Downtime decreases operator profitability. The ability to quickly change or upgrade the top box electronics allows the operator to keep the most exciting and attractive games on the floor without taking the gaming machine offline for extended periods of time. One approach to provide access to the electronics behind a secondary display is to mount the secondary display to trunnions attached to the top box frame. The secondary display thus pivots about the trunnions permitting access to the electronics located behind the display. A shortcoming of this approach is that the weight of the secondary display causes it to succumb to gravity and settle about its center of gravity. Another shortcoming is that the operator must release a side-accessible spring pin in order to pivot the secondary display. The spring pin occupies space around the sides of the display, imposing a constraint on the size of the display that can be installed.

Thus, there is a need for a releasable mounting system that overcomes the foregoing and other shortcomings. The present invention fulfills this and other needs.

SUMMARY OF THE INVENTION

In accordance with an aspect of the present invention, a releasable mounting system for incrementally pivoting a display assembly includes a hub assembly coupled to a housing of a display assembly. The hub assembly includes at least one projection adapted to mate with one of a plurality of detents formed on the surface of a plate against which the hub is pivotally secured. The hub assembly may include a hub, a plurality of loaded projections positioned at a given distance from the hub assembly. Audible and tactile feedback can be generated in response to the projection mating with the detents. The releasable mounting system may further include a release releasably engaged with the hub assembly and a release plate attached to the display assembly housing and to the release. The release plate may include a channel adapted to guide the hub assembly into a releasably engaged position within the channel such that the hub assembly is releasably held into place by walls of the channel and a hook portion of the release. The hook portion can be movable to disengage the hub assembly from the release.

In accordance with another aspect of the invention, a method of releasably mounting a pivotable display assembly to a frame of a gaming machine is provided. The method includes coupling a trunnion assembly to the frame of the gaming machine, forming a plurality of detents radially spaced about the trunnion assembly, aligning a protrusion with a first detent to define a first holding position, and rotating the display assembly about the trunnion assembly from the first holding position until the display assembly stops at a second holding position defined by the alignment of the protrusion with a second detent. The detents or the protrusions can be formed on the frame. The rotating can produce audible and tactile feedback as the display assembly stops at the second holding position.

The method may further include mounting the display assembly to the frame of the gaming machine by moving the trunnion assembly along a channel formed by walls of a plate coupled to the display assembly until the trunnion assembly is locked into place within the channel by a release attached to the plate, the release being movable to allow or disallow the trunnion assembly to move relative to the channel. The method may further include releasing the display assembly by moving the release such that it allows the trunnion assembly to be moved out of the channel.

The above summary of the present invention is not intended to represent each embodiment, or every aspect, of the present invention. Additional features and benefits of the present invention will become apparent from the detailed description, figures, and claims set forth below.

BRIEF DESCRIPTION OF THE DRAWINGS

The foregoing and other advantages of the invention will become apparent upon reading the following detailed description and upon reference to the drawings.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DESCRIPTION OF ILLUSTRATIVE EMBODIMENTS

Figure 1:
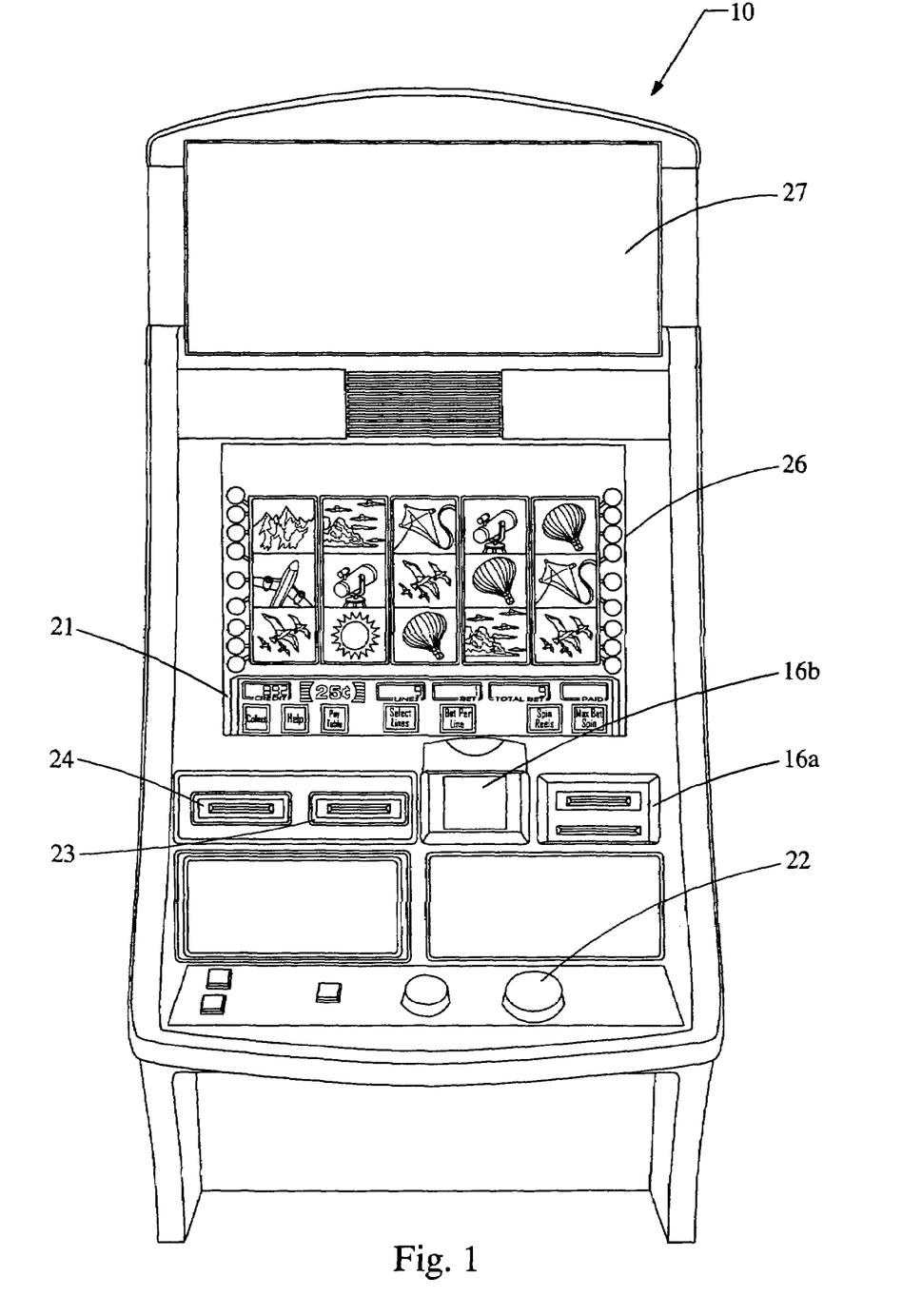
FIG. 1 is a perspective view of a video gaming terminal according to an embodiment of the present invention.

FIG. 1 shows a perspective view of a typical gaming terminal 10 used by gaming establishments, such as casinos. With regard to the present invention, the gaming terminal 10 may be any type of gaming terminal and may have varying structures and methods of operation. For example, the gaming terminal 10 may be a mechanical gaming terminal configured to play mechanical slots, or it may be an electromechanical or electrical gaming terminal configured to play video slots or a video casino game, such as blackjack, slots, keno, poker, etc.

As shown, the gaming terminal 10 includes input devices, such as a wager acceptor 16 (shown as a card wager acceptor 16*a* and a cash wager accepter 16*b*), a touch screen 21, a pushbutton panel 22, and an information reader 24. For outputs, the gaming terminal 10 includes a payout mechanism 23, a main display 26 for displaying information about the basic wagering game, and a secondary display 27 that may display an electronic version of a pay table, and/or also possibly game-related information or other entertainment features. The secondary display 27 can be mounted to a releasable mounting system of the present invention, embodiments of which are described in more detail below. While these typical components found in the gaming terminal 10 are described below, it should be understood that numerous other elements may exist and may be used in any number of combinations to create various forms of a gaming terminal.

The wager acceptor 16 may be provided in many forms, individually or in combination. The cash wager acceptor 16*a* may include a coin slot acceptor or a note acceptor to input value to the gaming terminal 10. The card wager acceptor 16*b* may include a card-reading device for reading a card that has a recorded monetary value with which it is associated. The card wager acceptor 16*b* may also receive a card that authorizes access to a central account, which can transfer money to the gaming terminal 10.

Also included is the payout mechanism 23, which performs the reverse functions of the wager acceptor 16. For example, the payout mechanism 23 may include a coin dispenser or a note dispenser to output value from gaming terminal 10. Also, the payout mechanism 23 may also be adapted to receive a card that authorizes the gaming terminal to transfer credits from the gaming terminal 10 to a central account.

The push button panel 22 is typically offered, in addition to the touch screen 21, to provide players with an option on how to make their game selections. Alternatively, the push button panel 22 provides inputs for one aspect of operating the game, while the touch screen 21 allows for inputs needed for another aspect of operating the game.

The outcome of the basic wagering game is displayed to the player on the main display 26. The main display 26 may take the form of a cathode ray tube (CRT), a high resolution LCD, a plasma display, LED, or any other type of video display suitable for use in the gaming terminal 10. As shown, the main display 26 includes the touch screen 21 overlaying the entire monitor (or a portion thereof) to allow players to make game-related selections. Alternatively or additionally, the gaming terminal 10 may have a number of conventional mechanical reels (not shown) to display the game outcome.

In some embodiments, the information reader 24 is a card reader that allows for identification of a player by reading a card with information indicating his or her true identity. Currently, identification is used by casinos for rewarding certain players with complementary services or special offers. For example, a player may be enrolled in the gaming establishment's players' club and may be awarded certain complementary services as that player collects points in his or her player-tracking account. The player inserts his or her card into the player-identification card reader 24, which allows the casino's computers to register that player's wagering at the gaming terminal 10. The information reader 24 may also include a keypad (not shown) for entering a personal identification number (PIN). The gaming terminal 10 may require that the player enter their PIN prior to obtaining information. The gaming terminal 10 may use the secondary display 27 for providing the player with information about his or her account or other player-specific information. Also, in some embodiments, the information reader 24 may be used to restore assets that the player achieved during a previous game session and had saved.

Figure 2:
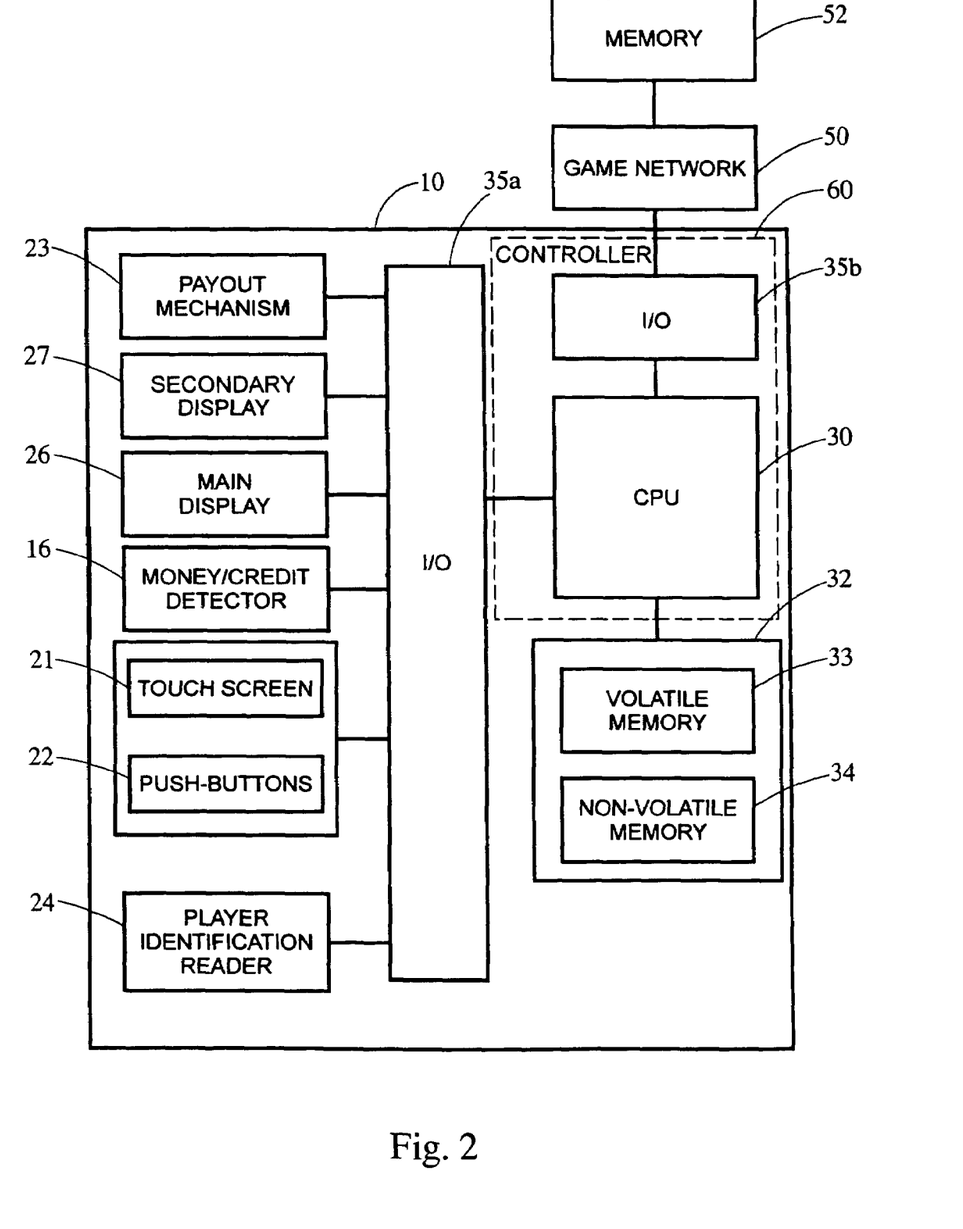
FIG. 2 is a block diagram of the gaming terminal of FIG. 1.

As shown in FIG. 2, the various components of the gaming terminal 10 are controlled by a central processing unit (CPU) 30 (such as a microprocessor or microcontroller). To provide the gaming functions, the CPU 30 executes a game program that allows for the randomly selected outcome. The CPU 30 is also coupled to or includes a local memory 32. The local memory 32 may comprise a volatile memory 33 (e.g., a random-access memory (RAM)) and a non-volatile memory 34 (e.g., an EEPROM). It should be appreciated that the CPU 30 may include one or more microprocessors. Similarly, the local memory 32 may include multiple RAM and multiple program memories.

Communications between the peripheral components of the gaming terminal 10 and the CPU 30 occur through input/output (I/O) circuits 35*a*. As such, the CPU 30 also controls and receives inputs from the peripheral components of the gaming terminal 10. Further, the CPU 30 communicates with external systems via the I/O circuits 35*b*, which together with the CPU 30 comprise a controller 60. Although the I/O circuits 35 may be shown as a single block, it should be appreciated that the I/O circuits 35 may include a number of different types of I/O circuits.

The gaming terminal 10 is typically operated as part of a game control network 50 having control circuitry and memory devices. The game control network 50 may optionally include a system memory 52 for alternative storage of data. The game network 50 can include instructions for playing games, such as progressive jackpots that are contributed to by all or some of the gaming terminals 10 in the network 50. The gaming terminal 10 often has multiple serial ports, each port dedicated to providing data to a specific host computer system that performs a specific function (e.g., account system, player-tracking system, progressive game control system, etc.). To set up a typical serial communication hardware link to the host system, the typical RS-232 point-to-point communication protocol that is often present in the gaming terminal 10 is converted to an RS-485 (or RS-485-type) master-slave protocol so as to take advantage of some of the advantages of the RS-485 capability (e.g., multi-drop capability that allows many gaming terminals 10 to communicate with the game control network 50). To perform this function, a custom interface board may be used by the gaming terminal 10 for each communication port in the gaming terminal 10. It should be noted that the gaming terminal 10 can initially be designed to be configured for a typical RS-485 protocol, instead of the typical RS-232 protocol. Further, the gaming terminal 10 may simply be designed for an Ethernet connection to the game control network 50.

As has been discussed, the gaming terminal 10 and/or the associated gaming network 50 is capable of executing wagering games on or through a controller. Controller 60, as used herein, comprises any combination of hardware, software, and/or firmware that may be disposed or resident inside and/or outside of a gaming terminal 10 or like machine that may communicate with and/or control the transfer of data between the gaming terminal and a bus, another computer, processor, or device and/or a service and/or a network. The network may include, but is no limited to a peer-to-peer, client/server, master/slave, star network, ring network, bus network, or other network architecture wherein at least one processing device (e.g., computer) is linked to at least one other processing device. The controller 60 may comprise one or more controllers. In an embodiment, each gaming terminal 10 comprises, or is connected to, a controller 60 enabling each gaming terminal to transmit and/or receive signals, preferably both, in a peer-to-peer arrangement. In another embodiment, the controller 60 may be adapted to facilitate communication and/or data transfer for one or more gaming terminals 10 in a client/server or centralized arrangement. In the embodiment shown in FIG. 2, the controller 60 in the gaming terminal 10 comprises a CPU 30 and the I/O circuits 35 (e.g., Network Interface Units) connecting the gaming terminal 10 via a conventional I/O port and communication path (e.g., serial, parallel, IR, RC, 10bT, etc.) to the game network 50, which may include, for example, other gaming terminals connected together in the network 50.

Figure 3A:
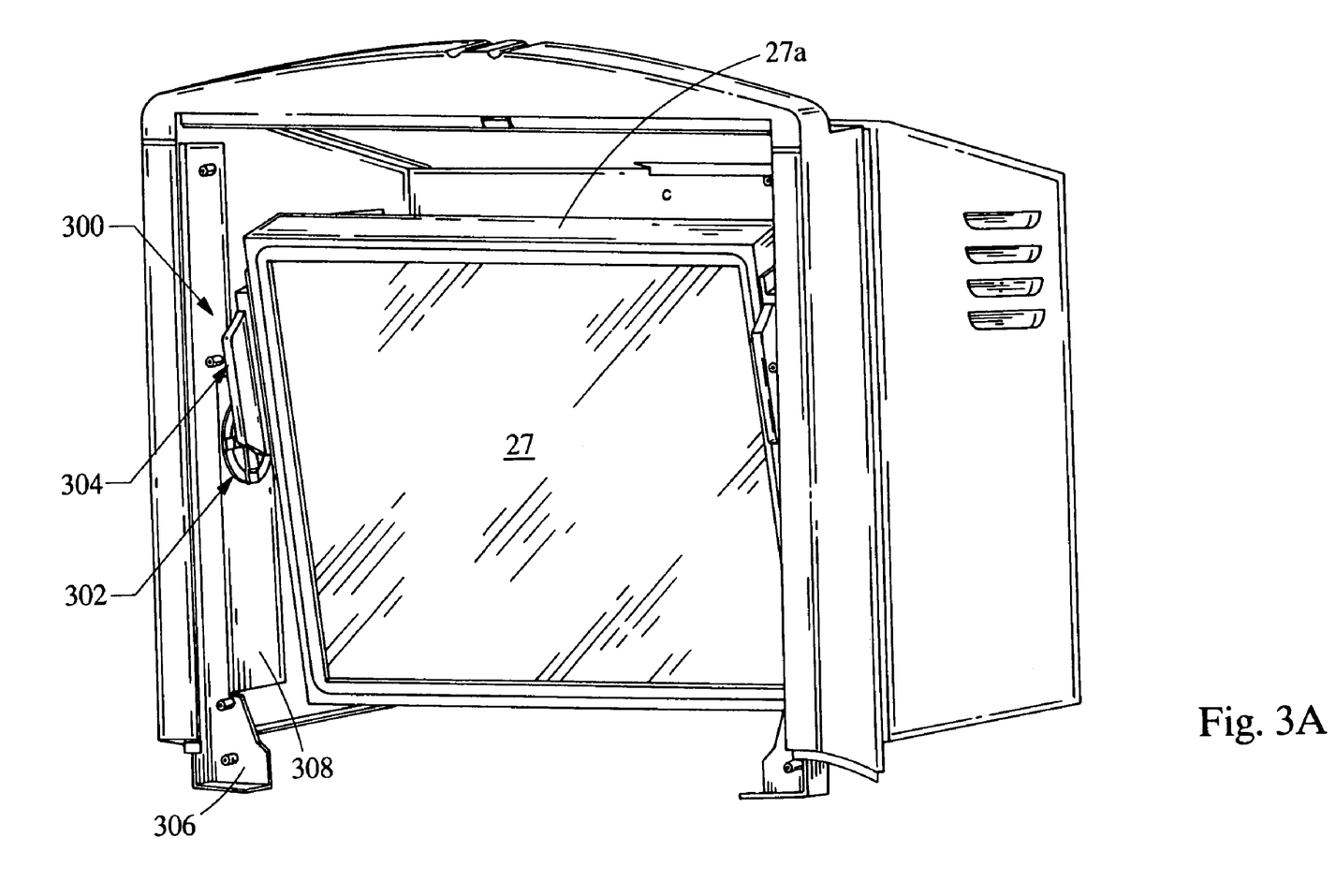
FIG. 3A is a perspective view of a top box area of the video gaming terminal illustrating a releasable mounting system according to an embodiment of the present invention.

Turning now to FIG. 3A, a releasable mounting system 300 according to an embodiment of the present invention is illustrated. The releasable mounting system 300 includes a mounting assembly 302, a release assembly 304, a frame 306, and a plate 308. The plate 308 is preferably integral with the frame 306, but alternatively, the plate 308 can be attached to the frame 306. The mounting assembly 302 is releasably mounted to a housing 27a of the secondary display 27 via the release assembly 304. Use of the release assembly 304 releases the housing 27a and the secondary display 27 from the releasable mounting system 300.

Figure 3B:
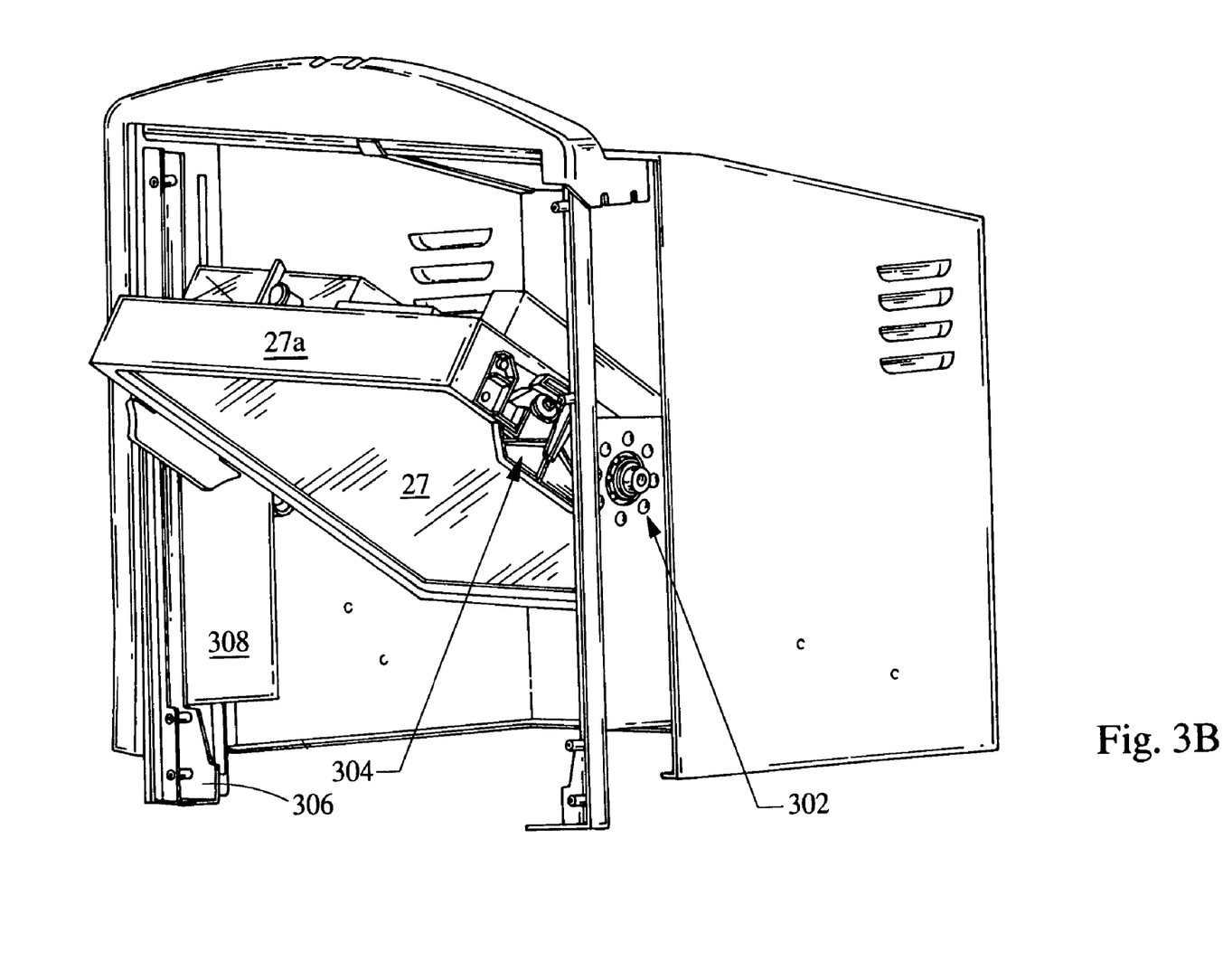
FIG. 3B is a perspective view of the top box area shown in FIG. 3A with the display pivoted at an angle.

Use of the mounting system 302 permits the secondary display 27 to be rotated at various angles relative to the frame 306. One such angle is shown in FIG. 3B. This angle, for example, might permit access to the top area behind the secondary display 27. Another view of the mounting assembly 302 and release assembly 304 is also shown in FIG. 3B. As will be further explained below, a feature of the mounting assembly 302 in an embodiment is that it permits the secondary display 27 to be rotated in fixed stops so that the secondary display 27 remains in place and does not tilt or rotate when it is pivoted into one of the fixed stops. Otherwise, the weight of the secondary display 27 would cause it to settle about its center of gravity, which may not be a desired angle in order to gain access to areas behind the secondary display 27.

Figure 4A:
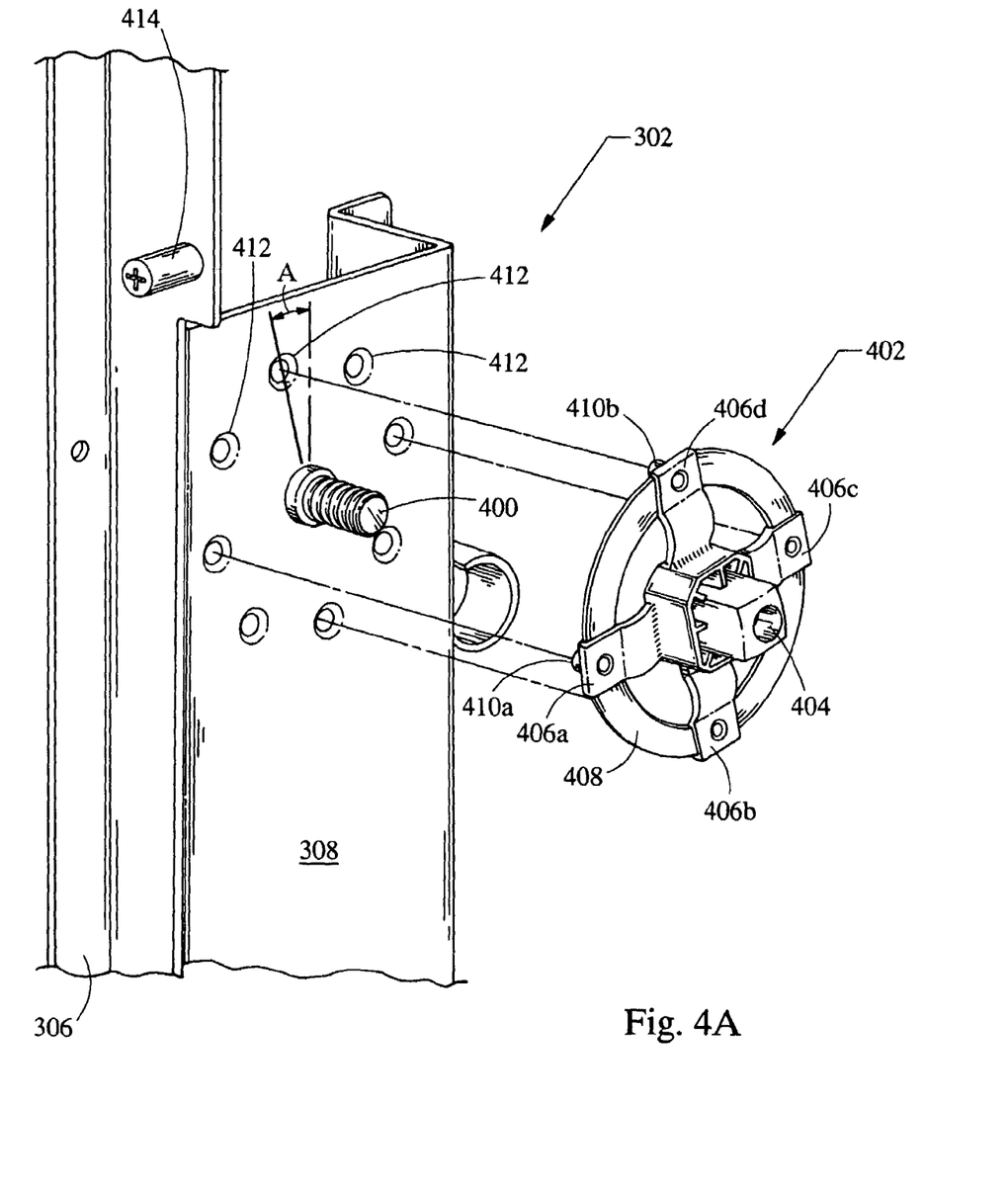
FIG. 4A is a perspective, exploded view of a mounting assembly according to an embodiment of the present invention.

FIG. 4A is a perspective exploded view of the mounting system 302. A hub assembly 402 includes a knot 404, projection tensioners (also referred to as spokes) 406a-d, and a wheel 408. Each of the spokes 406a-d terminates with a projection or protrusion 410 (only protrusions 410a,b are shown). Each of knot 404, spokes 406, wheel 408, or protrusions 410 can be integral or separate parts assembled together. The knot 404 as illustrated has a square profile, however in other embodiments, any suitable profile shape is contemplated. Fewer or more spokes 406 can be used in other embodiments.

Formed in the plate 308 of the frame 306 are eight equally spaced detents 412 arranged radially about a threaded shoulder bolt 400 that serves as a trunnion. The threaded shoulder bolt 400 is also broadly referred to as a mounting pivot. The protrusions 410 are adapted to fit within the corresponding detents 412 formed in the plate 308. The knot 404 is screwed onto the threaded shoulder bolt 400, and the knot 404 pivots about the threaded shoulder bolt 400 such that the protrusions 410 snap into with the corresponding detents 412, resulting in both tactile and audible feedback that the protrusions 410 have mated with the corresponding detents 412. Fewer or more detents can be used in other embodiments, and the detents can be apertures. In still other embodiments, the detents can be unequally spaced in a radial manner without departing from the present invention. Each of the detents represents an incremental position for holding the secondary display 27 in place until it is pivoted into another position. Although the detents 412 are shown on the plate 308 and the protrusions 410 are shown on the hub assembly 402, in other equivalent embodiments, the detents can be formed on the hub assembly 402 and the protrusions 410 can be formed on the plate 308.

Figure 4B:
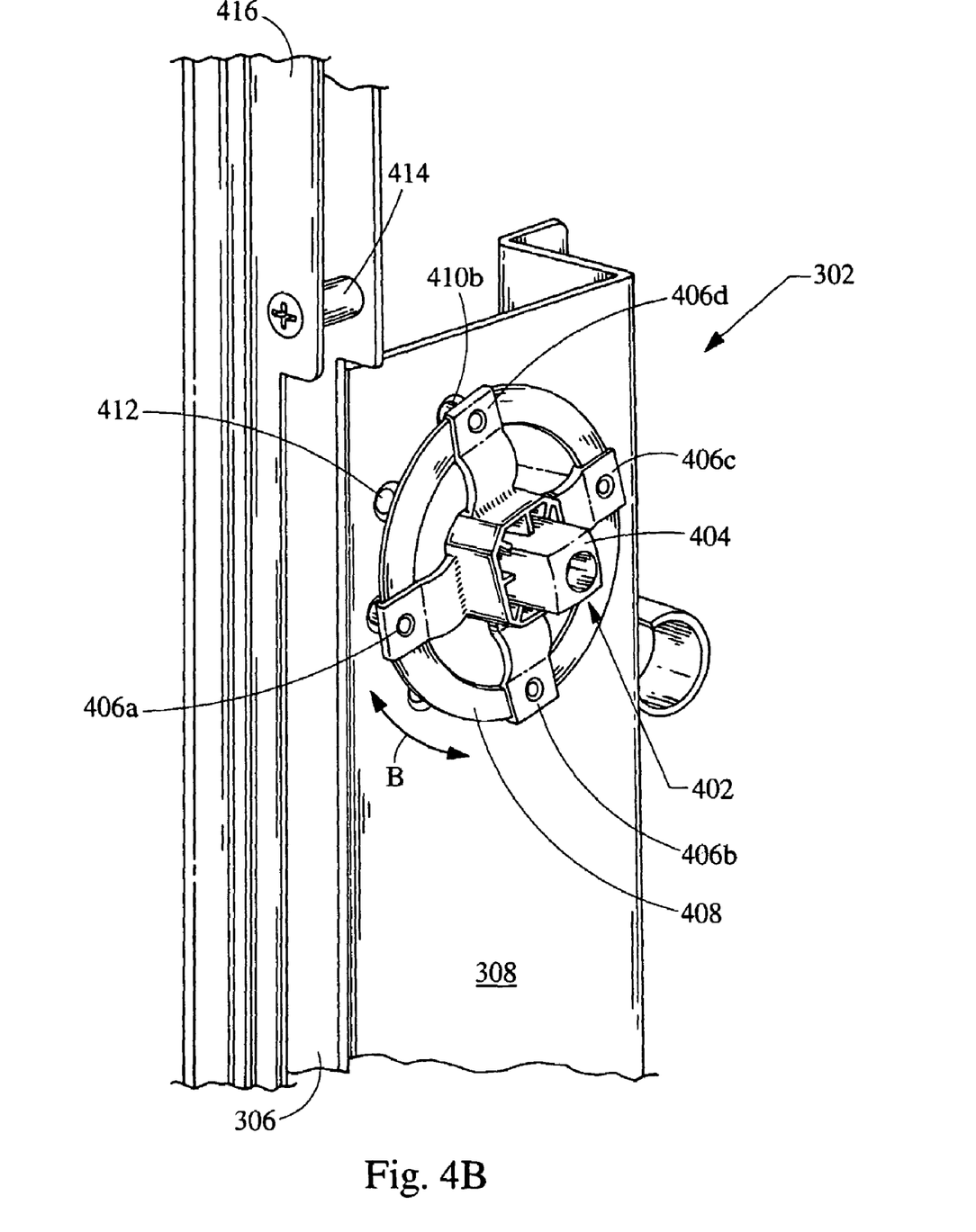
FIG. 4B is a perspective view of a mounting assembly positioned against a plate of a gaming machine according to an embodiment of the present invention.

FIG. 4B shows the hub assembly 402 positioned against the plate 308 in an installed position such that the protrusions 410 are mated with cooperating detents 412. A standoff 414 is attached to the frame 306 and to an outer frame 416 between which illuminated signage can be installed, such as a Vivacity lighting system. The detents 412 can be arranged such that the topmost detent is 0 degrees center relative to a vertical axis along the plate 308. Alternately, as illustrated in FIG. 4B, the detents 412 are arranged such that the topmost detent is canted off-center (12 degrees) relative to the vertical axis (shown by angle A in FIG. 4A), such that when the secondary display 27 is mounted with the mounting assembly 302, it is slightly angled relative to a vertical axis of the gaming machine 10. The hub assembly 402 can be rotated in a clockwise or counter-clockwise direction as shown by arrow B.

It should be noted that the operator can pivot the secondary display 27 by simply pushing or pulling on the secondary display 27 with sufficient force to cause the protrusion 410b to separate from their corresponding detents 412. As soon as the protrusion 410b mates with another set of corresponding detents 412, the secondary display 27 will remain in that position until a sufficient force is applied to cause it move. Thus, the operator can position the secondary display 27 advantageously to gain access to any area around the secondary display 27 without having the secondary display 27 swing to or settle upon a disadvantageous position. As mentioned above, the movement of the protrusion 410b in and out of the detents 412 results in not only audible feedback that the protrusion 410b has mated with corresponding detents 412 but also tactile feedback. These audible and tactile feedbacks inform the operator when the secondary display 27 is in a static position.

Figure 5:
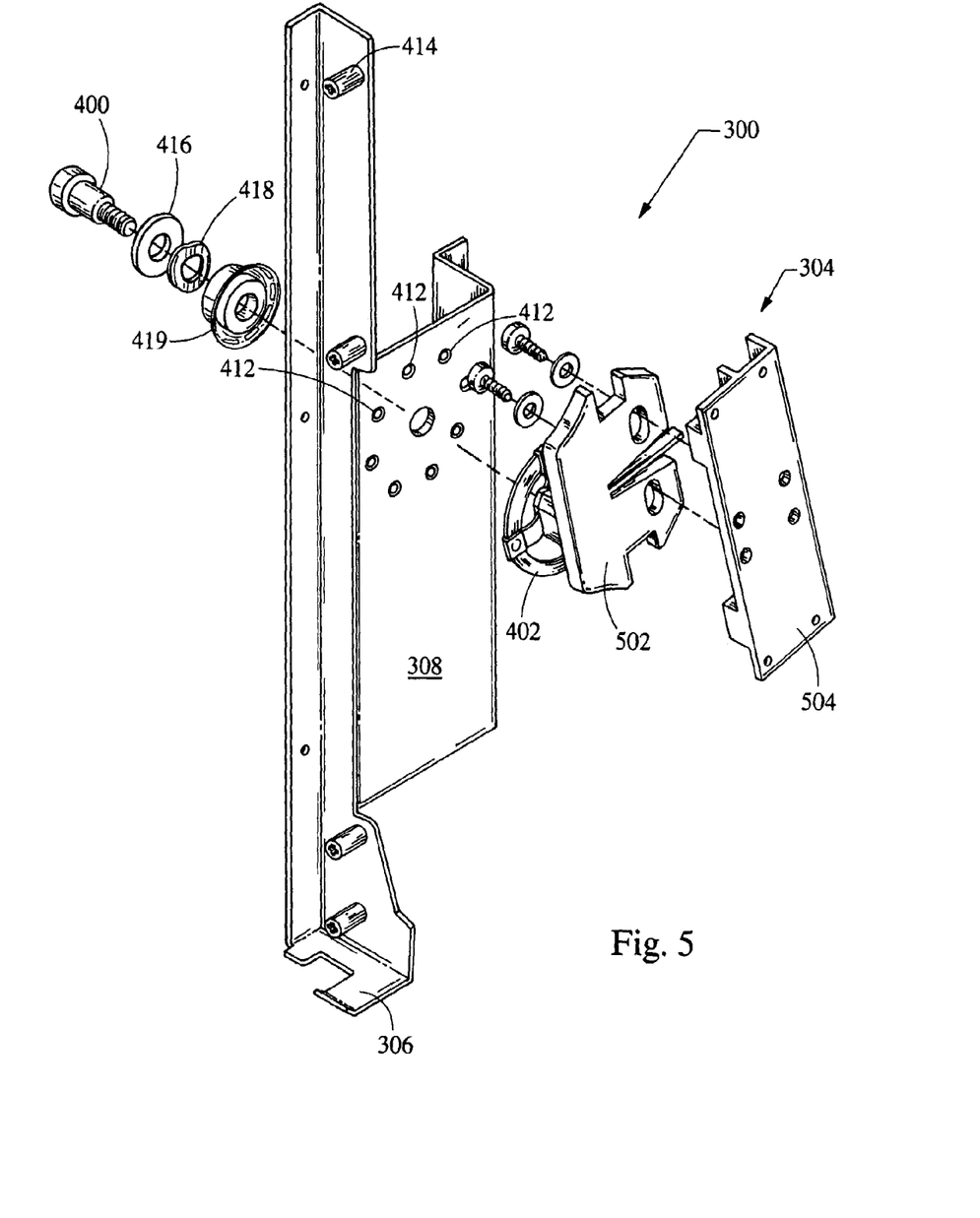
FIG. 5 is a perspective, exploded view of a mounting assembly and a release assembly according to an embodiment of the present invention.
Figure 6:
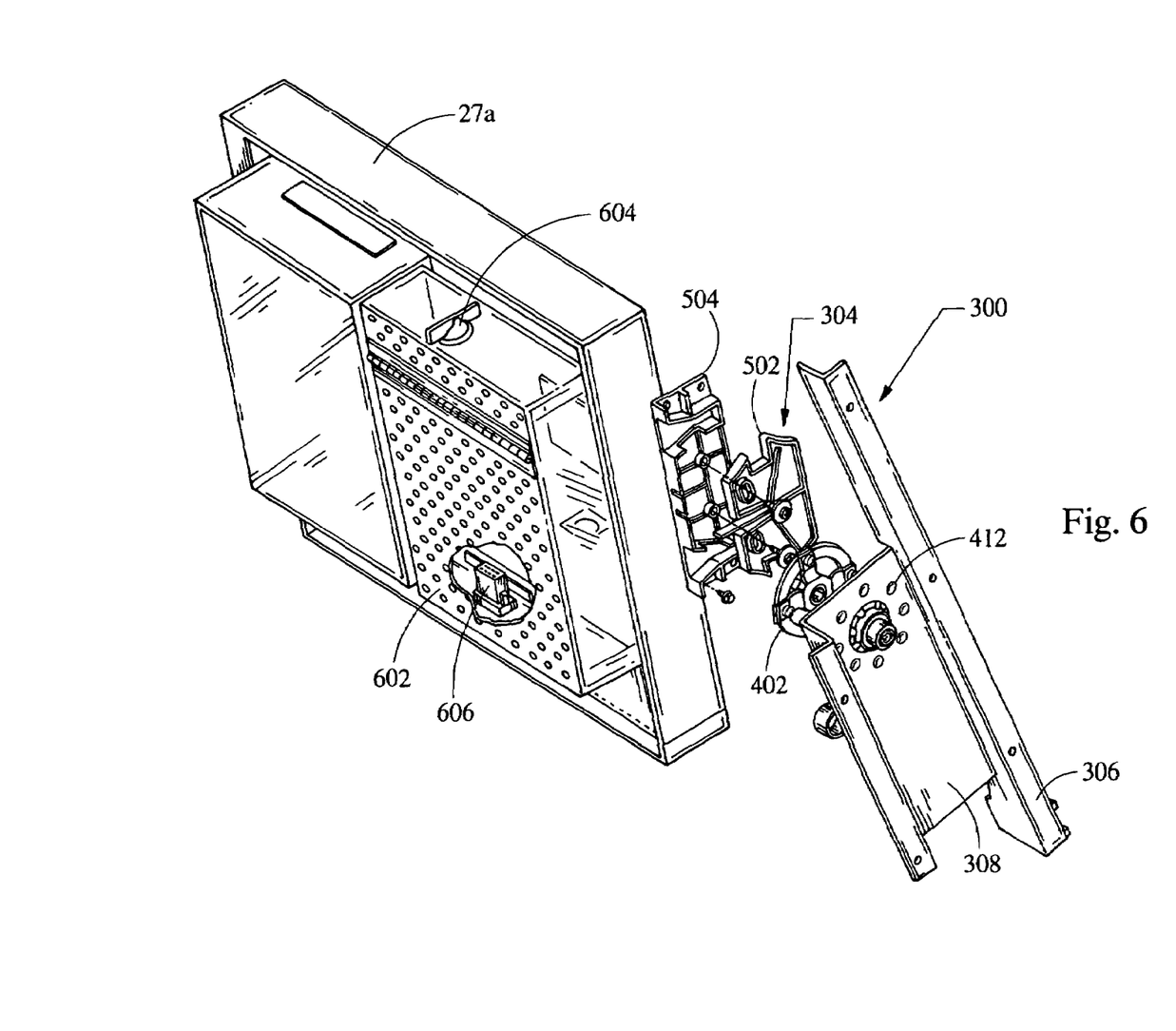
FIG. 6 is a perspective, exploded view of a releasable mounting system and a display according to an embodiment of the present invention.

FIG. 5 illustrates a perspective exploded view of the releasable mounting system 300 including the hub assembly 402 and the release assembly 304 that includes a release 502 and a release plate 504. Another perspective exploded view of the releasable mounting system 300 with the secondary display 27 is shown in FIG. 6. Behind the secondary display 27 are electronics 602 that are secured by a lock 604. A connector 606 is accessible from the bottom of the housing enclosing the electronics 602. The lock 604 is accessible from the top of the secondary display 27, and by pivoting the display about fixed stops defined by the detents 412, access to the electronics 602, the lock 604, and the connector 606 is possible.

The releasable mounting system 300 includes a flat washer 416, a spring washer 418, and a thrust washer 419 as shown in FIG. 5. The washers allow the threaded shoulder bolt 400 to move when the protrusions 410 of the hub assembly 402 rotate out of the detents 412. In an alternate embodiment, another set of detents (not shown) are formed in the bottom portion of the plate 308, which is attached to the frame 306. This other set of detents (not shown) can be identical in number and spacing relative to the detents 412 or they may differ in number and spacing.

Figure 7:
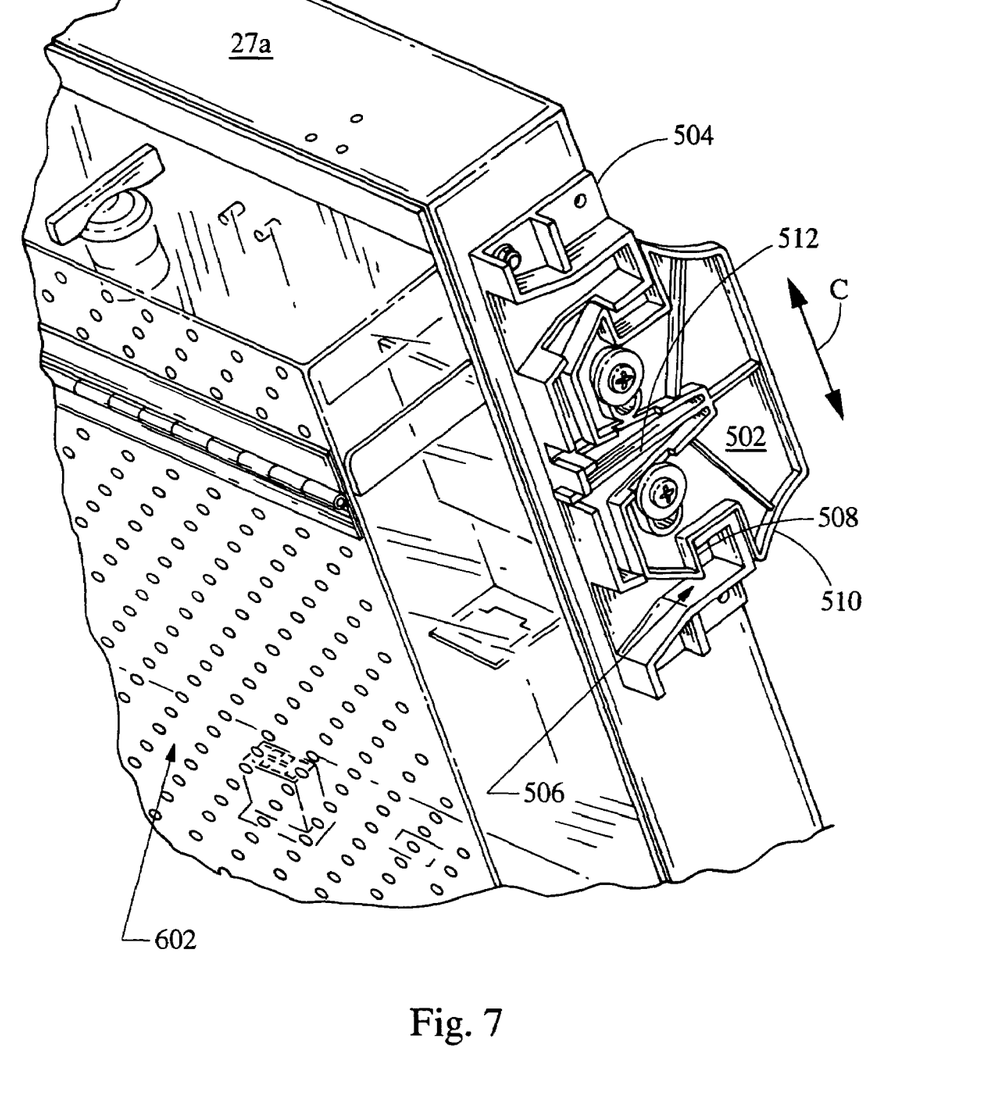
FIG. 7 is a perspective view of a release assembly positioned against a display housing according to an embodiment of the present invention.

FIG. 7 shows the release assembly 304 installed against the housing 27a. The release 502 is attached to the release plate 504, which in turn is attached to the housing 27a. The release plate 504 includes a channel 506 defined by walls of the release plate 504 as illustrated, and the release 502 includes a hook portion 508 and a tongue 512 that is held in place by the release plate 504. Preferably, the release 502 is made of a material, such as plastic, that permits the tongue 512 to be flexed without breaking. As will be explained in more detail below, the knot 404 of the mounting assembly 302 is received in the channel 506 and held in place by the hook portion 508 and the channel 506, which together define a substantially closed area until the release 502 is moved in direction C such that the hook portion 508 releases the display assembly 27 from the mounting assembly 302. To release the display assembly 27 from the mounting assembly 302, the operator presses (using a thumb, for example) against a surface portion 510 of the release 502 in the direction of arrow C. An upward pressing action causes the release 502 to move upward until the hook portion 508 unhooks from the knot 404, allowing the knot 404 (and thereby the mounting assembly 302) to glide out of the channel 506 until it clears the release plate 504.

As illustrated in FIG. 7, the release 502 and release plate 504 have a generally symmetrical profile, such that the upper and lower halves of each structure are largely mirror-images of one another. This symmetrical design simplifies manufacture and installation as only one piece is needed for use on both the left-hand and right-hand side of the display assembly 27. To install on the left side of the display assembly 27, the tongue 512 is received in the lower groove as shown in FIG. 7. To install on the right side of the display assembly 27, the tongue 512 is simply installed in the upper groove as shown in FIG. 7 (although when installed on the right side, the upper groove becomes the lower of the two grooves). Although the drawings illustrate a horizontal-mounting and release system, the same principles could be easily applied to a vertical-mounting and release system, where the mounting and release structures are located on the bottom and top of the display assembly 27 instead of on its right and left sides.

Figure 8:
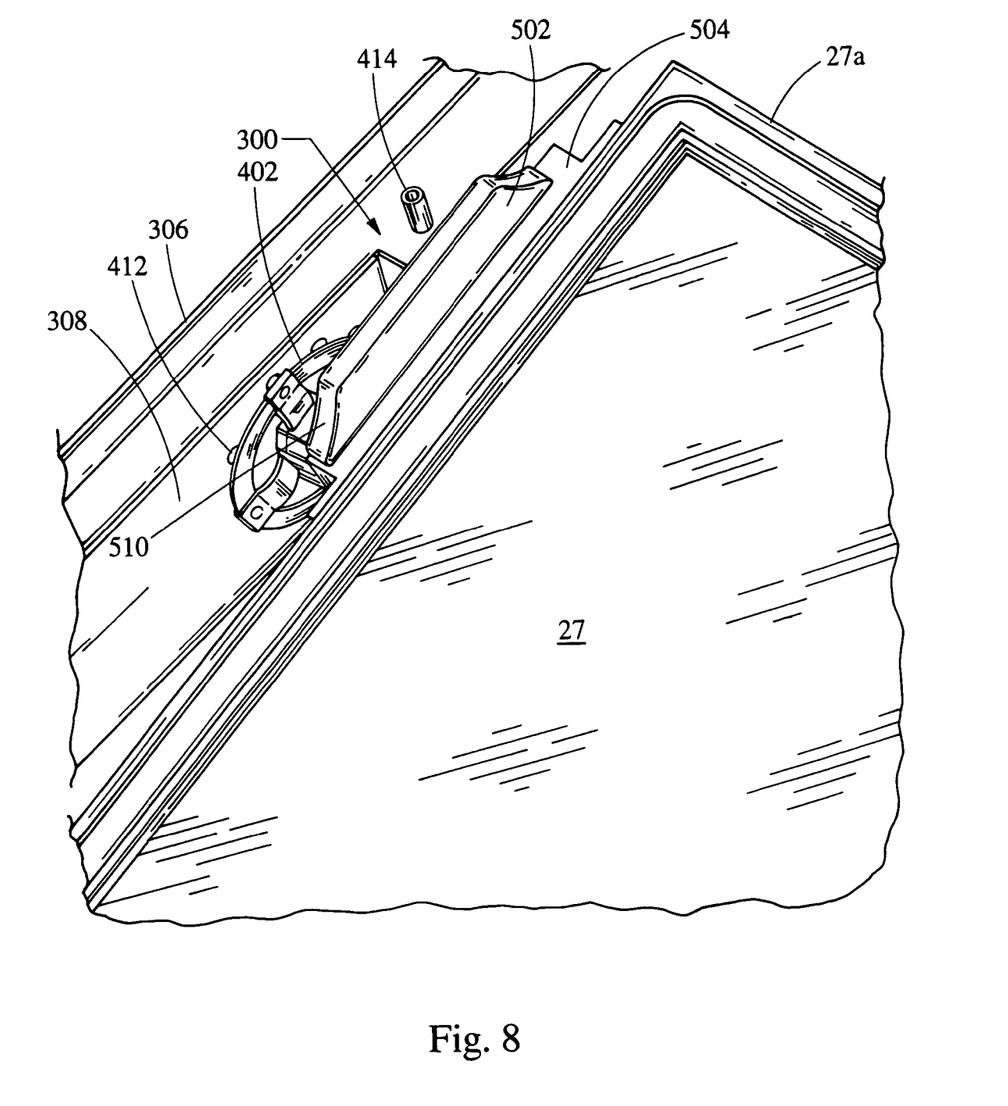
FIG. 8 is a perspective view of a releasable mounting system mounted to a display housing according to an embodiment of the present invention.
Figure 9:
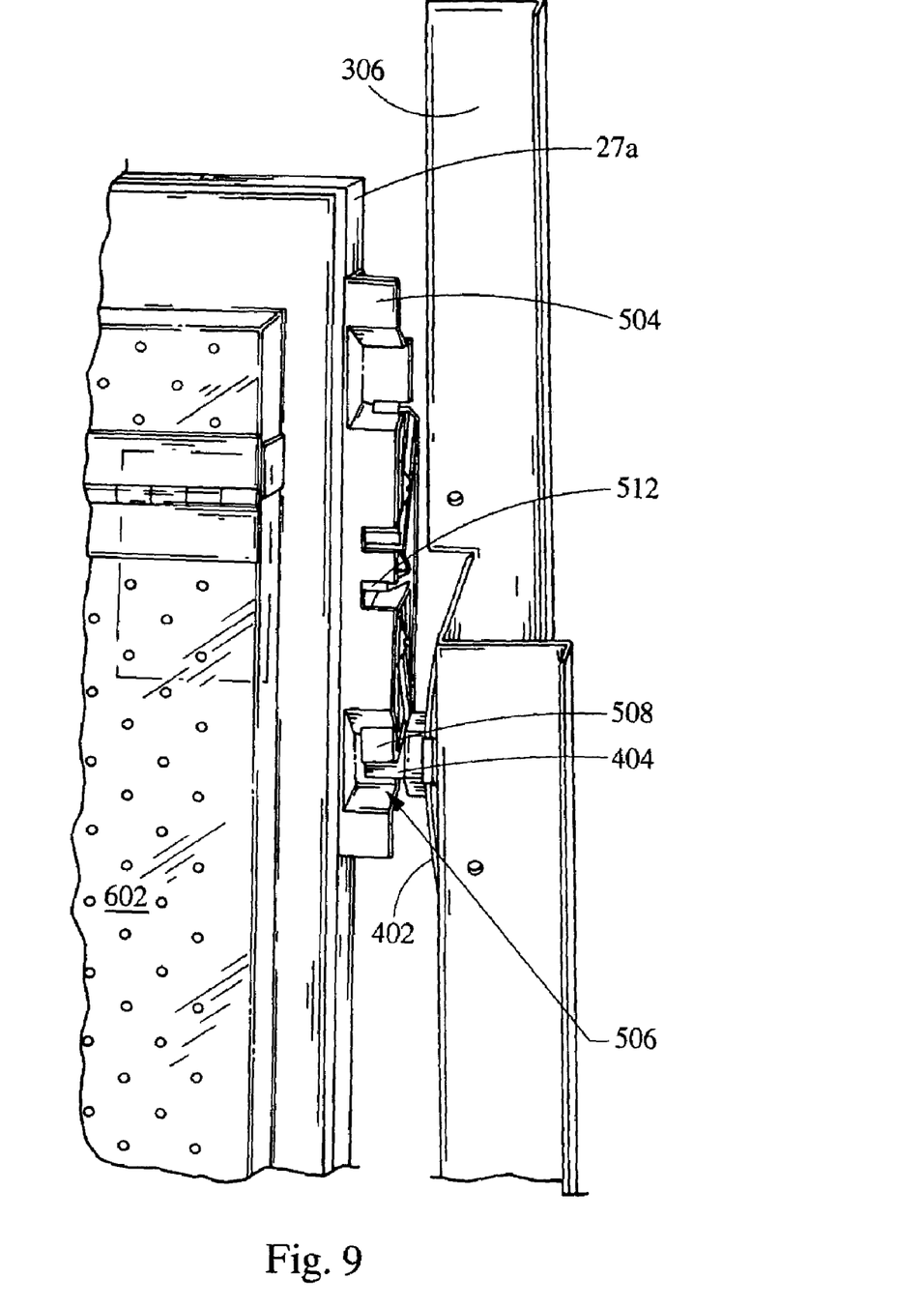
FIG. 9 is another perspective view of the releasable mounting system and display shown in FIG. 8.

FIG. 8 illustrates a top perspective view of the releasable mounting system 300 in a mounted position. A perspective view from behind the secondary display 27 is shown in FIG. 9. From this perspective, the knot 404 is shown held in position by the hook portion 508 within the channel 506. When the hook portion 508 is moved upwards by pressing on the surface portion 510 of the release 502 (and a corresponding hook portion on a releasable mounting system on the opposite side of the secondary display 27), the secondary display 27 can be pulled toward the operator to release it from the releasable mounting system 300. As can be seen particularly in FIG. 8, the release assembly 304 is positioned vertically and occupies relatively little horizontal space between the edge of the housing 27a of the secondary display 27 and the frame 306. The releasable mounting system 300 allows displays with varying widths to be installed in the gaming machine. As wider displays become more desirable, the releasable mounting system 300 allows the maximum width to be utilized across the gaming machine 10 while still providing the functionality of mounting a releasing a display to and from the gaming machine 10.

Although the foregoing description applied to the secondary display 27 in a top box area of the gaming machine 10, the present invention can be applied, in other embodiments, to the main display 26. In addition, although the releasable mounting system 300 illustrated in the drawings is both mountable and releasable, in other embodiments it is mountable only or releasable only. The secondary display 27 can be a plasma display, an LCD display, or any suitable flat panel or CRT video display. Additionally, the releasable mounting system 300 can be easily installed in other devices besides gaming machines.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

What is claimed is:

1. A gaming terminal having a mounting system for incrementally pivoting a display assembly among a plurality of positions, comprising:

an input device for receiving a wager to play a wagering game;

a frame that includes a plate;

a rotatable wheel coupled to a housing of said display assembly, said display assembly being mounted relative to said frame of said gaming terminal and includes a display for displaying information relating to said wagering game playable on said gaming terminal;

a plurality of detents arranged radially about a point defined by a central axis of said rotatable wheel; and a plurality of projections positioned to mate with respective ones of said plurality of detents, each of said plurality of projections extending outwardly along respective axes parallel to said central axis, wherein each of said projections are fixed relative to said plate or to said wheel;

wherein a central member of said wheel is pivotally secured to said plate via a mounting pivot protruding through said plate along said central axis, wherein said rotatable wheel rotates relative to said plate causing said display assembly to be rotated relative to said plate and fixedly held in place in any of said plurality of positions, said plurality of positions including a first position for viewing said information relating to said wagering game displayed on said display and a second position for permitting access to an area behind said display and interior to said gaming terminal, wherein said display assembly is rotatable at least 90 degrees from said first position, wherein said display assembly is pivoted between said first position and said second position by pushing or pulling on said display assembly with sufficient force to cause said projections to separate from said respective ones of said detents, wherein at least two of said projections mate within at least two corresponding ones of said detents when said display assembly is in said first position.

2. The gaming terminal of claim 1, further comprising a hub, a plurality of spokes connecting said hub to said wheel, said plurality of projections being positioned on said wheel.

3. The gaming terminal of claim 2, wherein said display assembly is rotatable at least 180 degrees about said central axis, wherein said projections are fixed directly to said wheel or to said wheel via said spokes, and wherein a distance between ends of said projections and said spokes remains fixed as said display assembly is rotated between said first and second positions.

4. The gaming terminal of claim 2, wherein said display assembly is rotatable at least 180 degrees about said central axis, and wherein said projections are fixed directly to said plate.

5. The gaming terminal of claim 1, wherein said plurality of projections is exactly four projections, and said plurality of detents is exactly eight detents.

6. The gaming terminal of claim 5, wherein said four projections are equally spaced apart from one another.

7. The gaming terminal of claim 1, wherein said plurality of detents are apertures.

8. The gaming terminal of claim 1, wherein said mounting pivot is received in said central member such that rotation of said central member causes said wheel to rotate.

9. The gaming terminal of claim 1, wherein audible and tactile feedback is generated in response to said plurality of projections mating with corresponding ones of said plurality of detents.

10. The gaming terminal of claim 1 in combination with a release system, said release system comprising:
 a release releasably engaged with said central member, said release including a hook portion and a surface portion distal from said hook portion; and
 a release plate attached to said housing of said display assembly and to said release, said release plate including a channel adapted to guide said central member into a releasably engaged position within said channel such that said central member is releasably held into place by walls of said channel and said hook portion, said hook portion being movable by said surface portion when said surface portion is pressed in a direction away from said central member to disengage said central member from said release in a direction that is transverse to said central axis.

11. The gaming terminal of claim 10, wherein said release and said release plate have generally symmetrical profiles such that said release and said release plate can be operatively installed on either of opposite sides of said display assembly.

12. The gaming terminal of claim 1, wherein said display assembly is mounted in a top box area of said gaming terminal.

13. The gaming terminal of claim 1 wherein said display is coupled to a controller programmed to cause said wagering game to be displayed on said display in response to receiving a wager from a player.

14. The gaming terminal of claim 1, wherein said display assembly includes a flat panel video display.

15. The gaming terminal of claim 14, wherein said flat panel video display is an LCD display.

16. The gaming terminal of claim 1, further comprising a main display for displaying a randomly selected outcome of said wagering game.

17. The gaming terminal of claim 1, wherein said display assembly is rotatable at least 180 degrees about said central axis.

18. The gaming terminal of claim 1, wherein said display assembly is rotatable at least 90 degrees about said central axis in a clockwise direction from a first position and at least 90 degrees about said central axis in a counter-clockwise direction from said first position.

19. The gaming terminal of claim 1, wherein ends of said projections remain a fixed distance from said plate or from said wheel as said display assembly is pivoted between said first and second positions.

20. A mounting system for use in a gaming terminal having a display assembly, comprising:
 a display assembly that includes a display for displaying information relating to a wagering game playable on said gaming terminal, said gaming terminal including an input device for receiving a wager to play said wagering game;
 means for pivotally mounting said display assembly to a plate in said gaming terminal, said means for pivotally mounting including a rotatable member that rotates with said display assembly as said display assembly is pivoted about an axis; and
 means for incrementally holding said display assembly in one of at least three positions as said display assembly is pivoted about said means for pivotally mounting, said means for incrementally holding including first structures that engage to mate with corresponding second structures of said rotatable member to hold said display assembly in said one of said at least three positions until said display assembly is pushed or pulled with sufficient force to cause said first structures to disengage from said second structures, said means for incrementally holding further including a support structure to which said first structures are fixed, wherein a first of said at least three positions permits viewing of said information relating to said wagering game displayed on said display and a second of said at least three positions permits access to an area behind said display and interior to said gaming terminal, wherein said display assembly is rotatable at least 90 degrees from said first position, and wherein said first structures and said second structure are arranged radially about a point defined by said axis, wherein at least two of said first structures mate within a corresponding at least two of said second structures when said display assembly is in said first position.

21. The mounting system of claim 20 in combination with a release system, said release system comprising means for releasing said display assembly from said gaming terminal such that said means for pivotally mounting is disengaged from said plate by first urging said means for releasing in a first direction, said means for pivotally mounting being disengaged by urging said display assembly in a direction transverse to said central axis and distinct from said first direction.

22. The system of claim 21, wherein said means for releasing has a generally symmetrical profile such that said means for releasing can be operatively installed on either of opposite sides of said display assembly.

23. The mounting system of claim 20, wherein said means for pivotally mounting includes a hub assembly rotatable about a shoulder bolt attached to said plate.

24. The mounting system of claim 20, wherein said display assembly is rotatable at least 180 degrees about said axis.

25. The mounting system of claim 24, wherein said supporting structure is a frame within said gaming terminal that includes a plate, said display assembly being mounted relative to said frame.

26. The mounting system of claim 24, wherein said supporting structure includes a plurality of spokes connecting a hub to a wheel, said plurality of projections being fixedly positioned relative to said wheel.

27. The mounting system of claim 20, wherein said first structures remain a fixed distance from said support structure as said display assembly is pivoted among said three positions.

28. A mounting system for incrementally pivoting a display assembly of a gaming machine and holding said display assembly in one of a plurality of incremental positions arranged radially about an axis, comprising:
   a rotatable member mechanically coupled to a housing of said display assembly and positioned along said axis;
   a frame that includes a plate, said display assembly being mounted relative to said frame of said gaming machine, said display assembly including a display for displaying information relating to a wagering game playable on said gaming machine, said gaming machine including an input device for receiving a wager to play said wagering game;
   a plurality of spaced-apart detents arranged radially about said axis and arranged relative to said rotatable member or to said plate, each of at least some of said plurality of detents defining respective ones of said plurality of positions, said plurality of incremental positions including a first position, a second position, and at least one intermediate position between said first position and said second position, wherein at least said first position permits viewing said information relating to said wagering game displayed on said display, wherein said display assembly is rotatable about said axis at least 90 degrees from said first position; and
   a plurality of projections arranged relative to the other one of said rotatable member and said plate so as to mate with corresponding ones of said plurality of detents as said rotatable member is rotated about said radial axis to align said plurality of projections with said corresponding ones of said plurality of detents, said plurality of projections extending outwardly along respective axes parallel to said axis;
   wherein said display assembly is held in place in at least said intermediate position when said rotatable member is rotated to mate said plurality of projections with said corresponding ones of said plurality of detents, said intermediate position permitting access to an area behind said display and interior to said gaming machine, wherein said display assembly is pivoted between said first position, said second position, and said intermediate position by pushing or pulling on said display assembly with sufficient force to cause said projections to separate from said corresponding ones of said detents, wherein at least two of said projections mate within at least two of said detents when said display assembly is in any of said positions.

29. The mounting system of claim 28, wherein the number of said plurality of projections is less than the number of said plurality of spaced-apart detents.

30. The mounting system of claim 28, wherein said plurality of spaced-apart detents are formed in a generally circular pattern in said plate and said plurality of projections are arranged about a periphery of said rotatable member, said rotatable member having a generally circular shape.

31. The mounting system of claim 30, wherein said plurality of projections are in a fixed relationship with said rotatable member.

32. The mounting system of claim 28 in combination with a release system, wherein said rotatable member includes a central member, said release system further comprising:
   a release releasably engaged with said central member, said release including a hook portion and a surface portion distal from said hook portion; and
   a release plate attached to said housing of said display assembly and to said release, said release plate including a channel adapted to guide said central member into a releasably engaged position within said channel such that said central member is releasably held into place by walls of said channel and said hook portion, said hook portion being movable by said surface portion when said surface portion is pressed in a first direction away from said central member to disengage said central member from said release in a direction that is transverse to said axis and distinct from said first direction.

33. The mounting system of claim 28, wherein said display assembly is held in place in at least said first position when said rotatable member is rotated to mate said plurality of projections with said corresponding ones of said plurality of detents.

34. The mounting system of claim 33, wherein said display assembly is held in place in said second position when said rotatable member is rotated to mate said plurality of projections with said corresponding ones of said plurality of detents.

35. The mounting system of claim 28, wherein said display assembly is rotatable at least 180 degrees from said first position.

36. The mounting system of claim 28, wherein ends of said projections remain a fixed distance from said plate or from said rotatable member as said display assembly is pivoted between any of said positions.

* * * * *